(No Model.) 2 Sheets—Sheet 1.

W. E. BROOKE.
SAW TOOTH.

No. 259,471. Patented June 13, 1882.

Attest:
H. H. Schott
A. R. Brown

Inventor:
William E. Brooke
Per J. C. Tastler atty (No Model.) 2 Sheets—Sheet 2.

W. E. BROOKE.
SAW TOOTH.

No. 259,471. Patented June 13, 1882.

Attest:
F. H. Schott
A. R. Brown.

Inventor:
William E. Brooke
pr J. C. Paskerally

UNITED STATES PATENT OFFICE.

WILLIAM E. BROOKE, OF TRENTON, NEW JERSEY, ASSIGNOR TO THE AMERICAN SAW COMPANY, OF SAME PLACE.

SAW-TOOTH.

SPECIFICATION forming part of Letters Patent No. 259,471, dated June 13, 1882.

Application filed February 4, 1882. (No model.)

*To all whom it may concern:*

Be it known that I, WILLIAM E. BROOKE, a citizen of the United States, residing at Trenton, in the county of Mercer and State of New Jersey, have invented certain new and useful Improvements in Saw-Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a simple and efficient means of securing a movable saw-tooth, so that it may be readily removed and replaced when required without the inconveniences incident to the employment of the ordinary rivets.

To this end my invention consists in the combination, with a recessed saw-plate and a removable tooth, of a locking-latch pivoted in said tooth and having certain peculiarities of form, as hereinafter more fully set forth.

Figure 1:
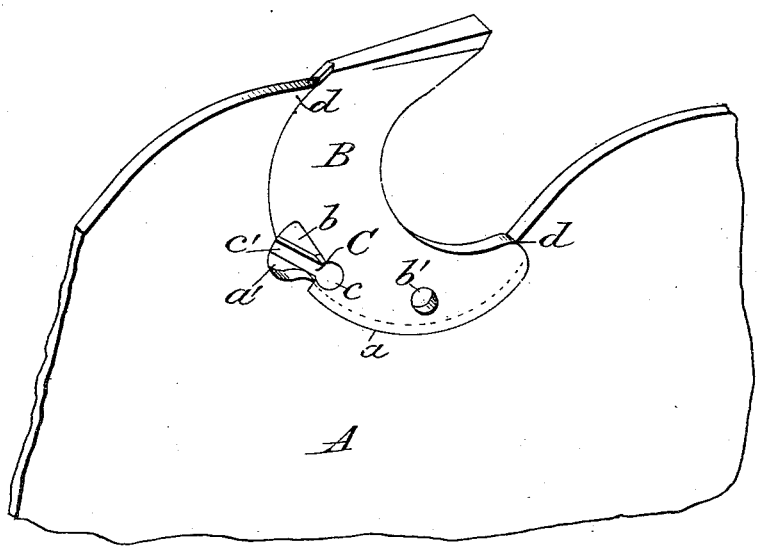
Figure 2:
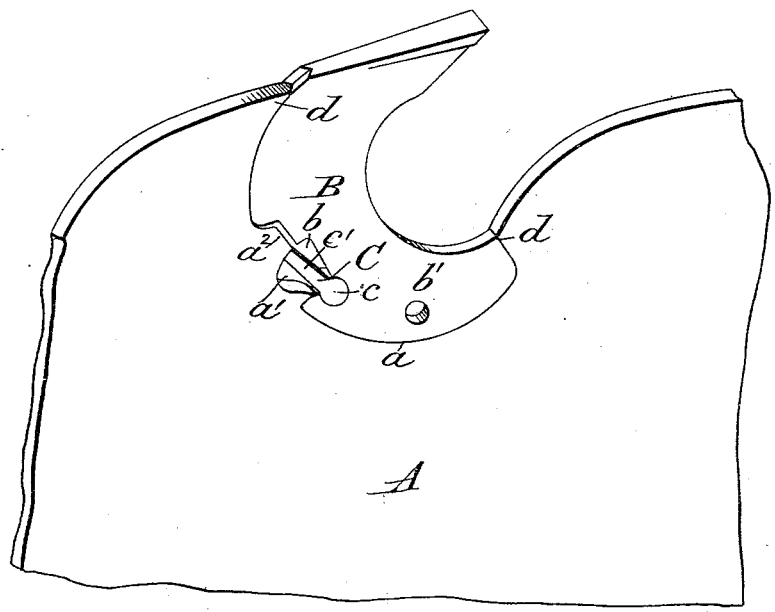

In the annexed drawings, which fully illustrate my invention, Figure 1 is a side view of a section of a circular saw with tooth inserted, showing the manner of securing said tooth; and Fig. 2 is a similar view, showing a modified form of a saw plate and tooth.

Like letters indicate like parts.

The periphery of the saw-plate A is provided with a series of recesses, $a$, each of which corresponds in general outline with the contiguous edges of the tooth B. Near the center of each recess $a$ is a deeper recess, notch, or depression, $a'$, opposite which in the tooth B is a recess, $b$, having at one end a circular opening for the reception of the disk end of a partially-rotating latch, C, which is thus pivoted in the movable tooth, the said disk $c$ being retained in position by upsetting a little head on each end or side, so as to permit the latch to be moved freely without liability of slipping out of place. The tooth B, which is of a general semi-lunar form, as shown, is expanded or swaged at its point in the usual manner, and when secured by forcing down the latch C it abuts firmly against the projections $d$ $d$ of the saw-plate. The tooth is seated in the usual manner by means of a triangular groove in its inner edge, which fits over a correspondingly-beveled tongue on the edge of the recess formed in the saw-plate. When the tooth is seated in the recess $a$ and the latch C turned down until its free end or arm $c'$ bears firmly against the edge of the saw-plate in the notch or recess $a'$, it is evident that the tooth will be thereby secured without liability of injurious strain either to itself or to the saw-plate. In order to remove the tooth, a suitable implement is employed having pins adapted to engage in a circular opening, $b'$, formed in the tooth, and also in the space $a'$ beneath the arm of the latch C, a slight movement of the implement being sufficient to raise the latch, and thus disengage the tooth from the saw-plate.

The latch C consists of a disk or pivotal portion, $c$, from which projects an arm, $c'$, which fits in the recess $b'$ when not in use, but is adapted to be turned down so as to bear against the edge of the saw-plate, and thus hold the tooth in position by springing its ends outward against the projections or abutments $d$ $d$ at each end of the recess in the saw-plate.

In Fig. 2 is shown a movable saw-tooth, which is secured in position in the same manner as the tooth illustrated in Fig. 1, the form of the tooth as well as the recess for its reception being, however, slightly different from that first above described. This difference consists in making the upper portion of the recess $a$ of greater depth than the corresponding part shown in Fig. 1 and separating it from the notch $a'$ by a projection, $a^2$, which forms a bearing for the end of the latch, the inner edge of the tooth being formed to correspond with the altered shape of the recess.

I am aware that a pivoted locking-latch having a form similar to that employed by me is old, and also that movable saw-teeth have been locked within the recess of the saw-plate by means of a latch having its bearings in a recess within the tooth and a sub-recess within the saw-plate. These features, therefore, I do not claim broadly.

Having thus described my invention, what I claim as new, and desire to secure by Letters Patent, is—

The combination of the saw-plate A, having recess *a* and sub-recess *a'*, the movable tooth B, having recess *b*, and the locking-latch C, consisting of the disk *c*, having an arm, *c'*, said latch being pivoted in a circular opening formed at the end of the recess *b*, and capable of a partial rotation for the purpose of causing its arm *c'* to bear against the edge of the saw-plate in the recess *a'*, whereby the tooth is removably secured, substantially as shown and described.

In testimony whereof I affix my signature in presence of two witnesses.

WILLIAM E. BROOKE.

Witnesses:
WM. HARDEN,
J. J. ABRAMS.